United States Patent
Godecker et al.

(10) Patent No.: US 9,352,838 B2
(45) Date of Patent: *May 31, 2016

(54) AIRCRAFT GALLEY

(71) Applicant: B/E AEROSPACE, INC., Wellington, FL (US)

(72) Inventors: William J. Godecker, Irvine, CA (US); Peter John Leslie Burd, Carmarthensire (GB); William D. Aronson, Olathe, KS (US); Nicolaas J. van Zwieten, Ravenswaaij (NL); Sebastian Petry, Seattle, WA (US); Christopher I. Pirie, Mukilteo, WA (US); Mike Kemery, Seattle, WA (US); Aaron Hawkins, Seattle, WA (US); Erik Nilsen, Seattle, WA (US); Eddie Goh, Seattle, WA (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/596,820

(22) Filed: Jan. 14, 2015

(65) Prior Publication Data

US 2015/0122946 A1 May 7, 2015

Related U.S. Application Data

(63) Continuation of application No. 13/746,250, filed on Jan. 21, 2013, now Pat. No. 8,944,376.

(60) Provisional application No. 61/589,668, filed on Jan. 23, 2012.

(51) Int. Cl.
*B64D 11/04* (2006.01)
*B64D 11/00* (2006.01)

(52) U.S. Cl.
CPC ............ *B64D 11/04* (2013.01); *B64D 11/0007* (2013.01); *B64D 2011/0046* (2013.01); *Y02T 50/46* (2013.01)

(58) Field of Classification Search
CPC ............... B64D 11/0007; B64D 11/04; B64D 2011/0046
See application file for complete search history.

(56) References Cited

U.S. PATENT DOCUMENTS 6,761,332 B1 7/2004 Bengtsson
7,954,761 B2 6/2011 Johnson et al.
(Continued)

FOREIGN PATENT DOCUMENTS

WO 2012040564 A2 3/2012

OTHER PUBLICATIONS

International Search Report, 2 pages, Apr. 15, 2013, from PCT/US13/22583, published as WO 2013/112485 on Aug. 1, 2013.

*Primary Examiner* — Nicholas McFall
(74) *Attorney, Agent, or Firm* — Fulwider Patton LLP

(57) ABSTRACT

An aircraft galley is disclosed having a stand-alone beverage station and a stand-alone food preparation station. Each station is equipped with extendable work decks and integrated equipment for plug and play exchange. The beverage station is equipped with brewing stations and a top loading refuse compartment, and the food preparation station is configured with multiple ovens and refrigeration units. The galley further includes a side refrigeration unit which can be used as a self-service beverage area for passengers, and both stations may further be configured with LED displays for communicating with passengers.

9 Claims, 9 Drawing Sheets

(56) References Cited

U.S. PATENT DOCUMENTS

| | | |
|---|---|---|
| 8,087,611 B2 | 1/2012 | Arnold et al. |
| 2005/0121978 A1 | 6/2005 | McAvoy |
| 2007/0228216 A1 | 10/2007 | Wenstrom |
| 2008/0001031 A1 | 1/2008 | Doebertin et al. |
| 2008/0150406 A1 | 6/2008 | Arnold et al. |
| 2008/0258477 A1 | 10/2008 | Wagner et al. |
| 2010/0240290 A1 | 9/2010 | Markwart et al. |
| 2010/0307350 A1 | 12/2010 | Cunningham et al. |
| 2011/0084164 A1 | 4/2011 | Lee |
| 2011/0148664 A1 | 6/2011 | Shiomori et al. |
| 2011/0266864 A1 | 11/2011 | McAvoy |
| 2012/0285335 A1 | 11/2012 | Cunningham et al. |

AIRCRAFT GALLEY

CROSS-REFERENCES TO RELATED APPLICATIONS

This is a continuation application based on U.S. Ser. No. 13/746,250, filed on Jan. 21, 2013, which claims priority from U.S. Provisional Application No. 61/589,668, filed Jan. 23, 2012, incorporated by reference in its entirety.

BACKGROUND

Present day commercial aircraft are traditionally configured with a food and beverage preparation area, commonly referred to as a galley, for service of the passengers and crew. The galley incorporates various types of equipment for the storage, preparation, and disposal of food and drink, such as refrigeration units, heaters, ovens, beverage brewing machines, and the like. In addition to the devices described above, galley equipment also may include devices such as beverage dispensers, trash compacters, beverage carts, and the like. However, existing galleys arrange these features as more like items in a box, rather than integrating the components into a single system. As with all aircraft equipment, today's aircraft galleys strive to be examples of efficiency and conservation of weight and space. Every component of the aircraft galley must abide by these principles, and be both compact and efficient but retain functionality and convenience. All of the equipment must also be arranged in a manner which is both ergonomic and efficient for the allotted space.

Organization is critical to a galley's function and success. A galley must have ample storage space and be arranged in manner that promotes efficiency in the tasks at hand. The galley must also be flexible to adapt to unique and constantly changing meal services and customer requests. Efficient equipment that allows quick preparation and clean up are essential to a properly functioning galley. Ergonomics can also play an important role in the design of a galley. Appliances and overhead storage areas can be hard to access for shorter flight attendants. Awkward repetitive movements may result in fatigue and injury, so galleys must be designed to account for these repetitive movements so as to alleviate the stress, where possible. Current galleys lack the work space necessary to prepare a meal and allow for clean-up without creating problematic positions for the attendant.

SUMMARY OF THE INVENTION

The present invention is a modular aircraft galley which is designed to promote efficiency, safety, space conservation and weight reduction. The galley of the present inventions includes two stand-alone stations, a beverage station and a food preparation station. Each station includes integrated appliances and space-saving features that promote efficiency and safety. The beverage station comprises multiple beverage brewing apparatus, beverage cart storage compartments, self-serve coolers for passengers, and at least one slide-out work deck to increase counter space when needed. The food preparation station includes multiple ovens and refrigeration units, beverage cart storage compartments, at least one slide out work deck, self-serve coolers and touch screen controls. The modular galley of the present invention provides all of the requisite equipment to effectively run a commercial aircraft beverage and food service operation in a compact, space conserving architecture.

DETAILED DESCRIPTION OF THE PREFERRED EMBODIMENTS

Figure 1:
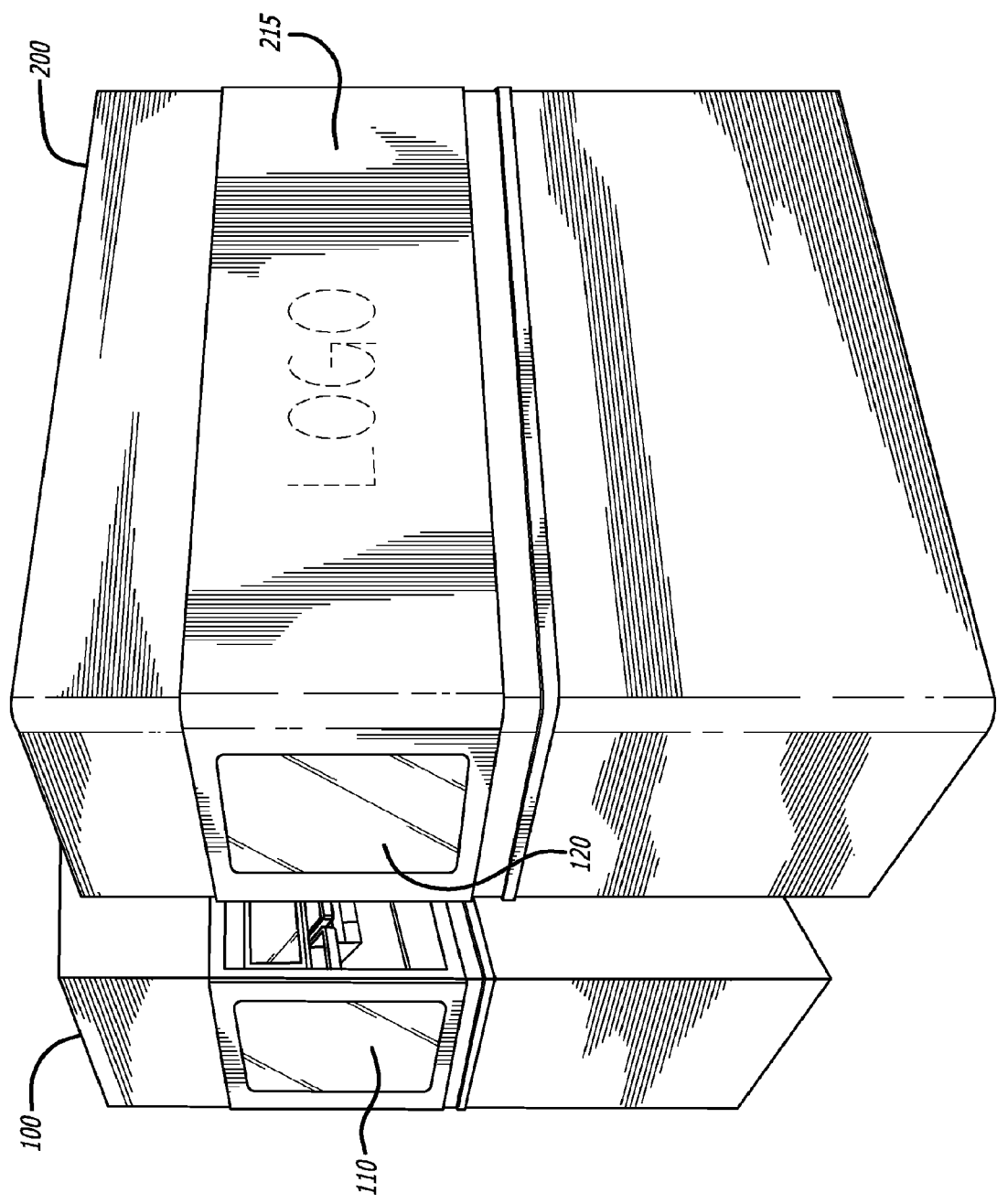
FIG. 1 is a perspective view of the exterior of the galley.

FIG. 1 illustrates an exterior view of the modular integrated galley of the present invention, comprising a stand-alone beverage station 100 and a stand-alone food preparation station 200. The beverage station 100 provides coffee, espresso, and a variety of beverages requested and which can be served to passengers, while the food preparation station 200 includes ovens, refrigerators, and equipment necessary for the storage, preparation, and clean-up of meal service. On the exterior of each station 100, 200 is a display screen 110,210, such as for example an LED screen, that can be used to provide instructions to passengers, display advertisements that can generate revenue for the airlines, or provide information on the amenities provided by the galley. The exterior of each station is also preferably equipped with a branding placeholder 215 which can be used to promote the airline or provide advertising space that can be leased by the airline or other advertisers. The branding placeholder 215 is large and in full view of the passengers for maximum exposure and visibility.

Figure 2:
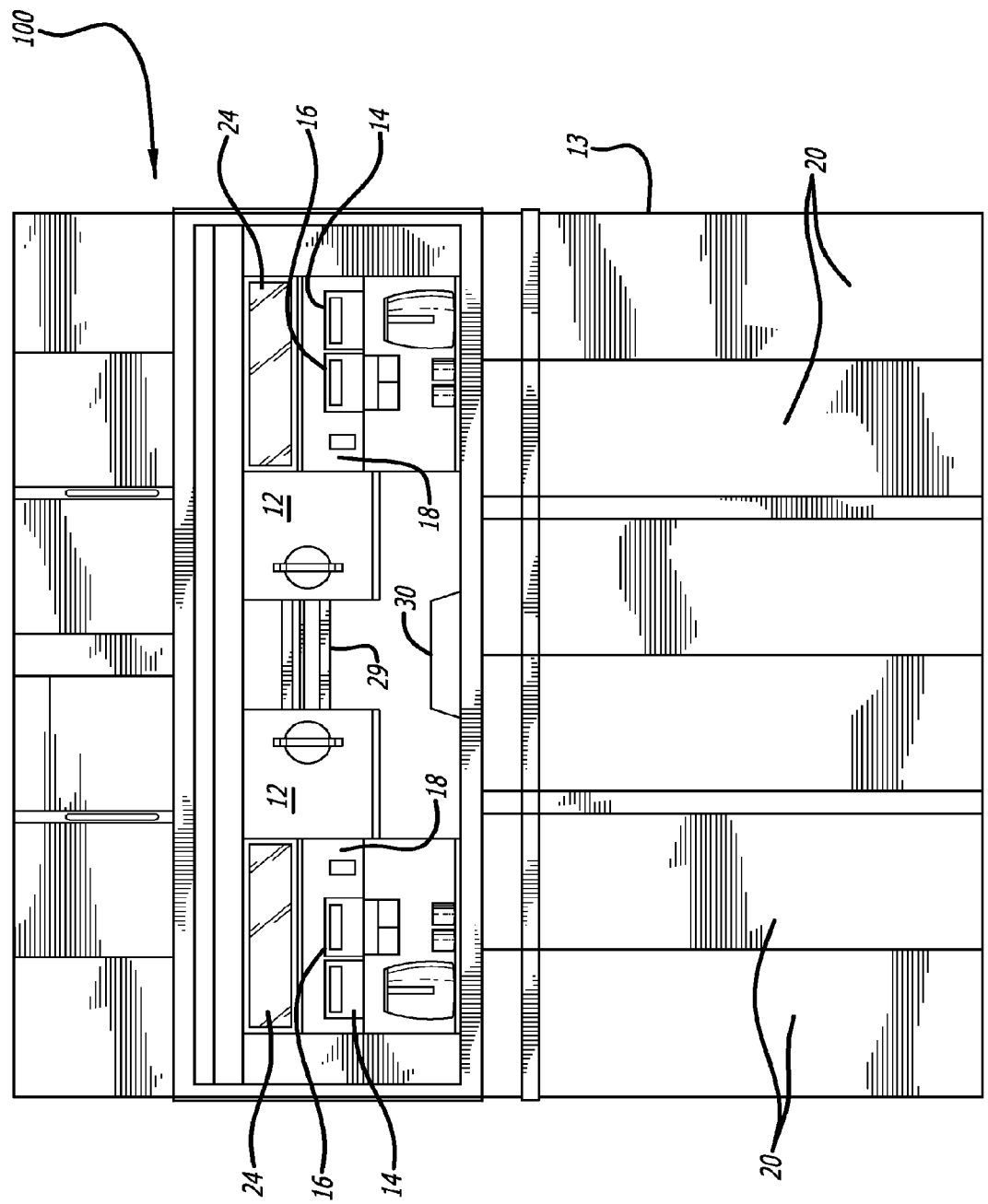
FIG. 2 is a front view of a preferred embodiment of the beverage station.

FIG. 2 illustrates a first preferred embodiment of the stand-alone beverage station 100 of the galley of the present invention, comprising a light weight structure 13 adapted to serve as a beverage distribution center in a commercial aircraft. The modular beverage center 100 features several integrated equipment for servicing passengers, including a side refrigeration unit for self-serving of soft drinks to passengers, two half ovens 12, two coffee makers 14, two espresso makers 16, and two hot water dispensers 18. The structure 13 includes six beverage cart storage compartments 20 that house beverage carts used to facilitate service to passengers, a sink 30 and faucet 29, a top loading trash chute, task lighting, and a touch screen user interface. All of the elements are arranged in a cost and space efficient manner that allows functionality without sacrificing performance. Each of the components will now be discussed in more detail below.

Figure 3:
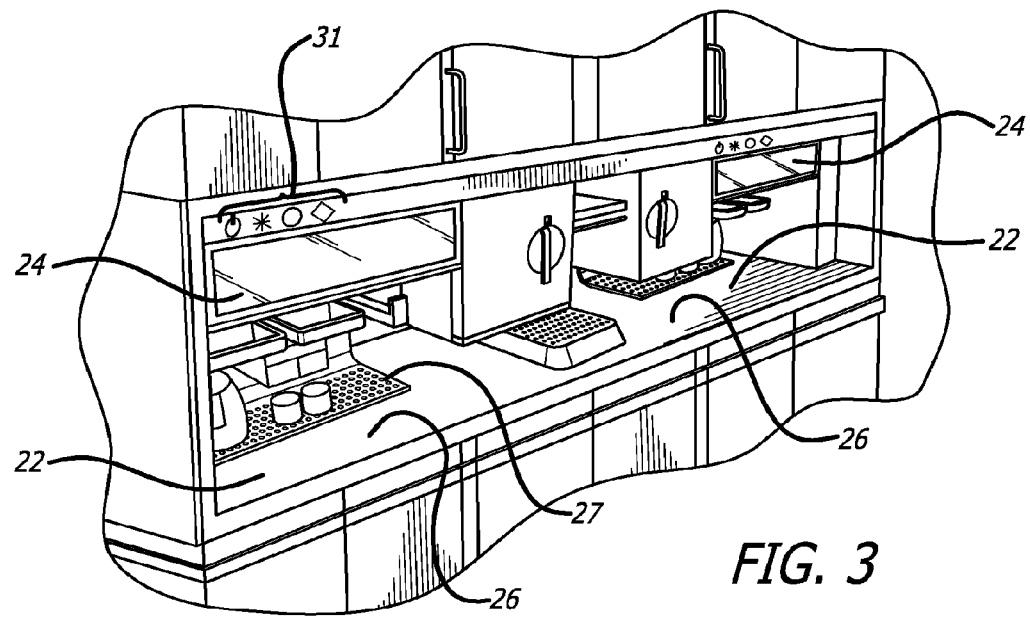
FIG. 3 is an elevated perspective view of the beverage brewing areas.

FIG. 3 illustrates first and second beverage centers 22 located on the left and right sides of the beverage station 100. Each beverage center 22 is located close to the adjacent isle of the aircraft to the maximize workflow. The beverage centers 22 are equipped with overhead lighting 40 to provide flight attendants with a visually accessible work area. A set of touch controls 31 above the cabinets 24 control the operation of the overhead lighting 40. The cabinets 24 above the beverage centers 22 are sized to hold numerous coffee and tea cups 42 for passengers and provide an easily accessible storage location. The cabinets 24 may be free of handles that interfere with the work space areas, and be at a level that is easily reached by flight attendants. The counters 26 in front of the beverage centers 22 include drip trays 27, are adequate to support a full meal tray, allowing the flight attendants the ability to put a tray down while preparing a beverage. In a preferred embodiment, touch controls 31 along the upper surface of the galley above the cabinet 24 include controls for each appliance in the beverage station 100. Dedicated touch screens 31 independently operate each appliance, and user interface screens 33 are customizable and upgradeable. Methods to provide a tactile feedback to the flight attendants in response to the actuation of the controls may include haptics or other display responses.

Figure 4:
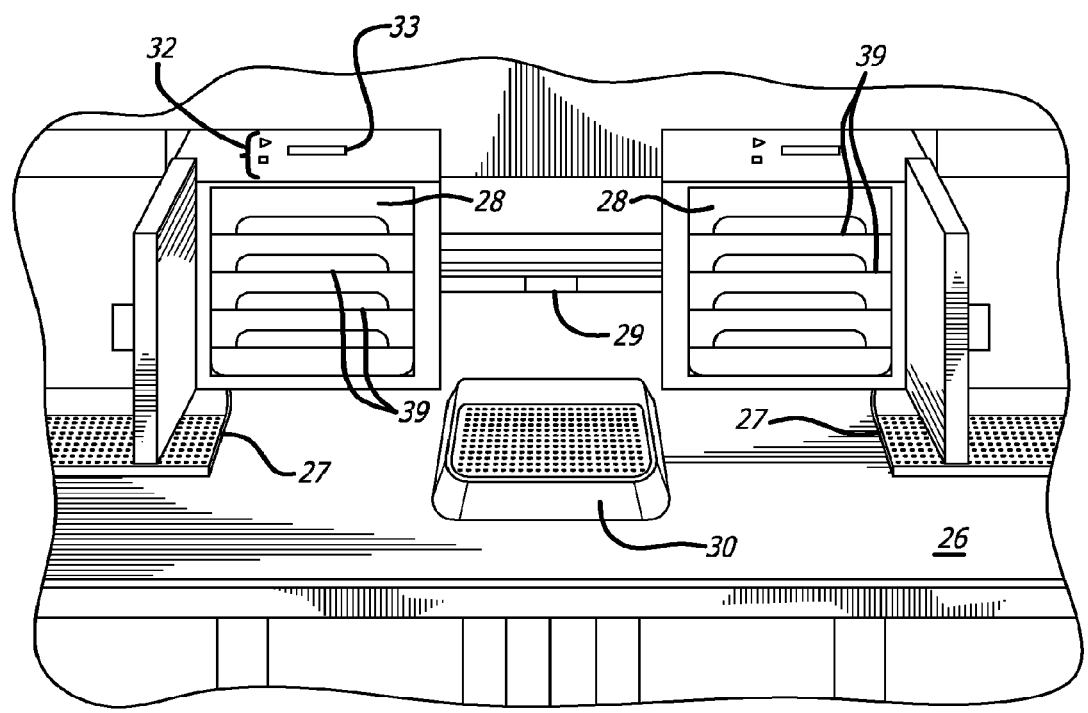
FIG. 4 is an enlarged front view of the sink and faucet area.
Figure 5:
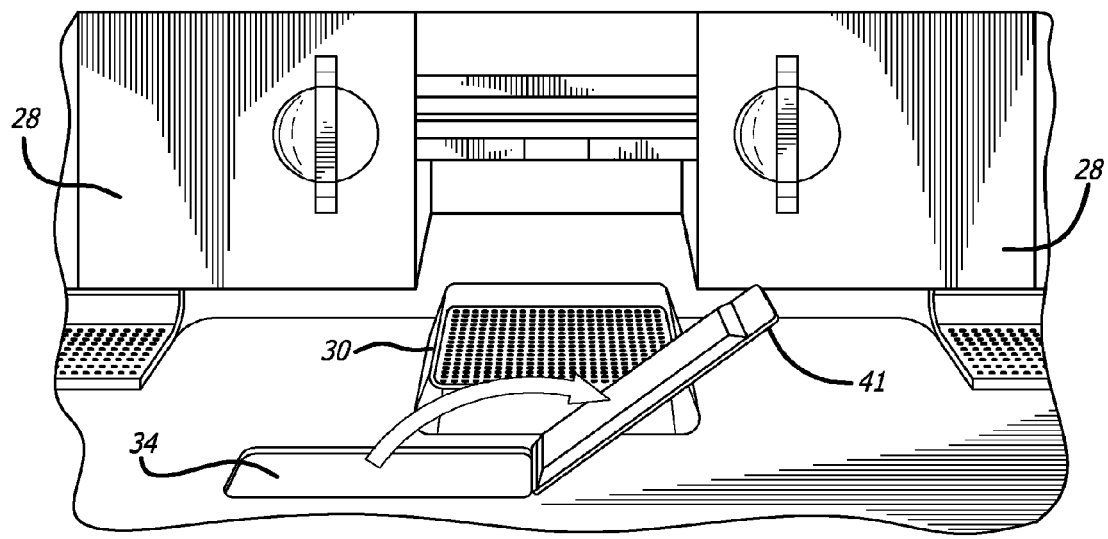
FIG. 5 is an enlarged front view of the top loading trash chute.

FIG. 4 illustrates the position of the ovens 28 and the sink 30 and faucet 29 in a presently preferred embodiment. The ovens 28 are multi-tiered 39 to allow preparation of a plurality of meals in a single cooking cycle. The touch screen controls 32 and interface screens 33 above the oven 28 provide easy access and efficiency in operating the ovens 28. The use of half ovens in a preferred embodiment offer the ability to cook different meals at different temperatures. They also cater to the special request of a passenger who wants his or her food prepared differently from other passengers. The ovens 28 are also configured so that full size food trays can fit in multiple configurations to suit the needs of the particular situation. A sink 30 is usefully located between the two ovens 28, and includes a faucet 29 for rinsing dishes and other food preparation. As with the other features of the beverage station 100 of the present invention, overhead touch controls 32 for the oven 28 and sink 30 are conveniently located above the particular appliance. Adjacent the sink 30 as show in FIG. 5 is a top loading trash chute 34 with a pivoting door 41 that allows easy and convenient disposal of refuse generated by the food and beverage preparation. The top loading aspect of the trash chute 34 is more convenient than side loaded trash cans and reduces the time needed to clear and dispose of trash and waste.

Figure 6:
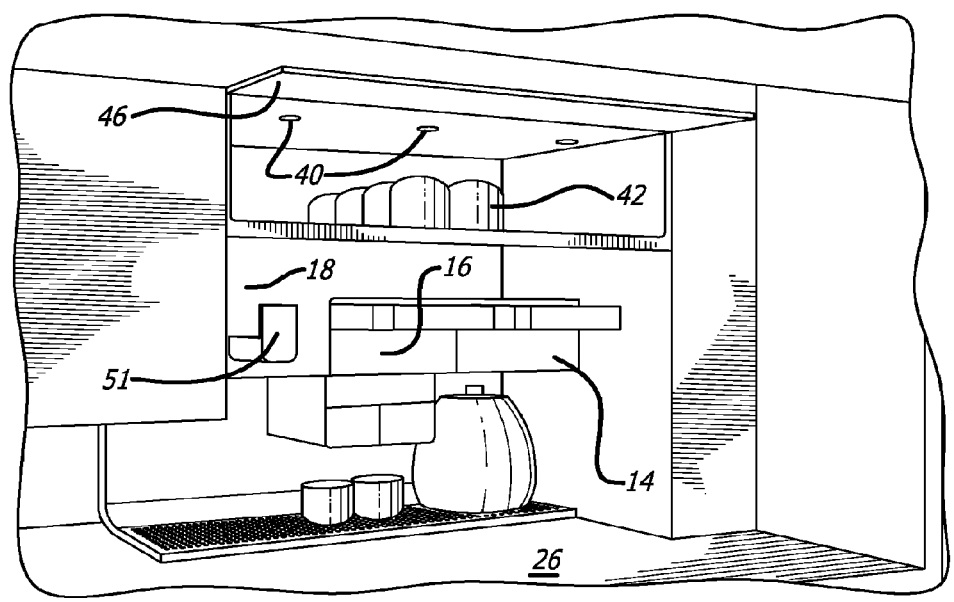
FIG. 6 is a perspective view of the beverage area and cabinet.

FIG. 6 illustrates one beverage center 22 and storage area 24 of the galley of the present invention, and also provides another view of the overhead lighting 40. The beverage center 22 includes a water boiler 18 with spigot 51 for dispensing hot water for tea and instant coffee, an espresso maker 16, and a coffee maker 14 for preparation of various teas and beverages. These appliances are positioned at work-deck height, improving ergonomics while reducing the opportunity for injury or spillage during turbulence. They are also modular, in that they can be quickly interchanged and replaced without the need to redesign the beverage station 100. The storage cabinets 24 located immediately above the beverage brewing apparatus have ample space for the coffee cups and mugs 42 without the need for stacking, which is important because turbulence can cause items to shift and possible fall out of the cabinets when opened. The doors 46 to the storage cabinets are preferably transparent to allow the flight attendants to be forewarned of any unsettled items in the cabinet 24 and allow quick and easy observation of the status of the cups 42 or stored items. In a preferred embodiment, the beverage units are of the plug and play design that allows airlines to customize the number and type of the beverage units.

Figure 7:
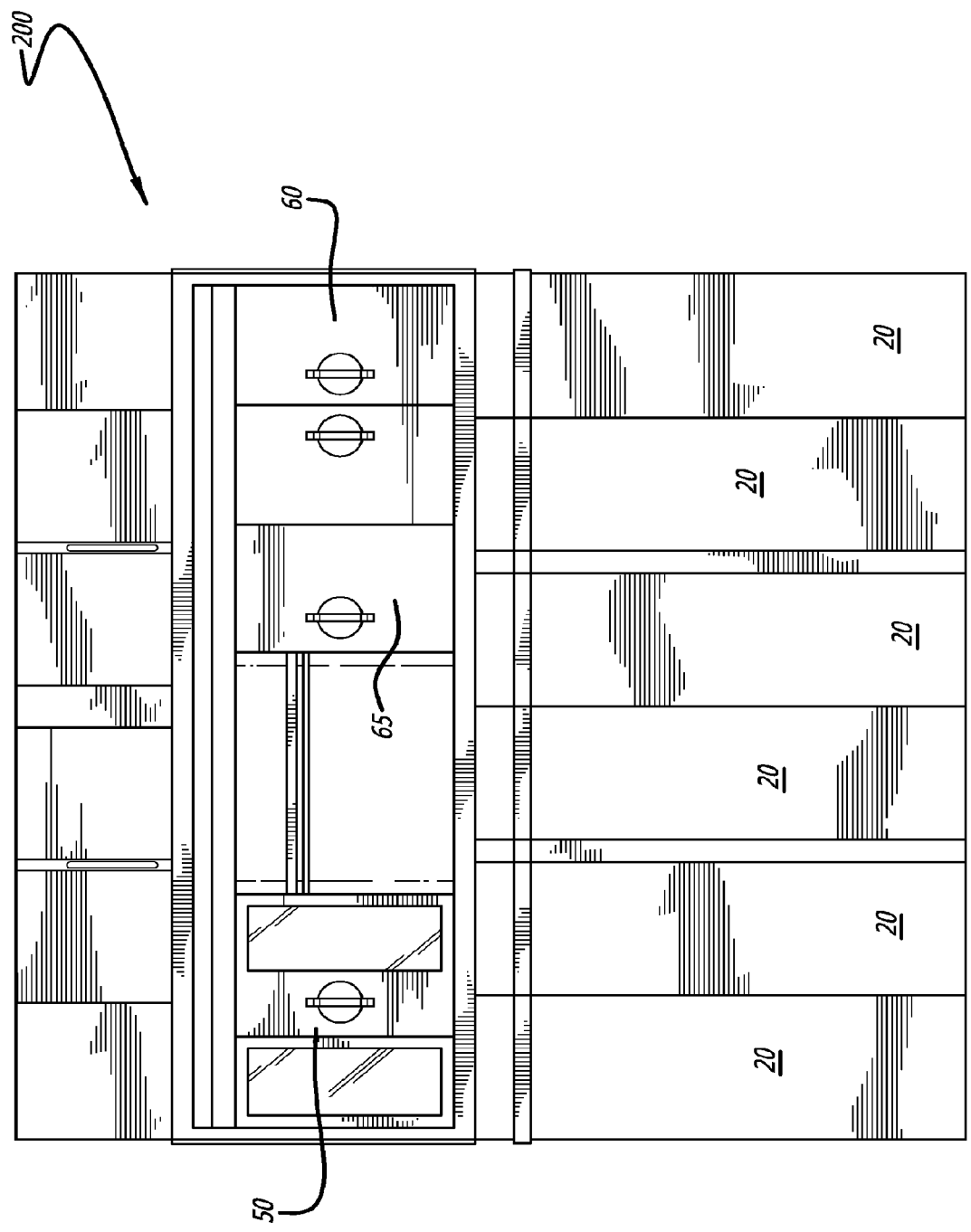
FIG. 7 is a front view of a first embodiment of the food preparation station.

FIG. 7 illustrates a food preparation station 200 which operates in conjunction with the beverage station 100 to achieve a full-service galley. The food preparation station 200 includes a side refrigeration unit that serves as a passenger self-service cooler, a double refrigerator 50, a double oven 60, a half oven 65, six beverage cart storage compartments 20, and an extendable work deck. Each of these components are discussed in more detail below.

Figure 8:
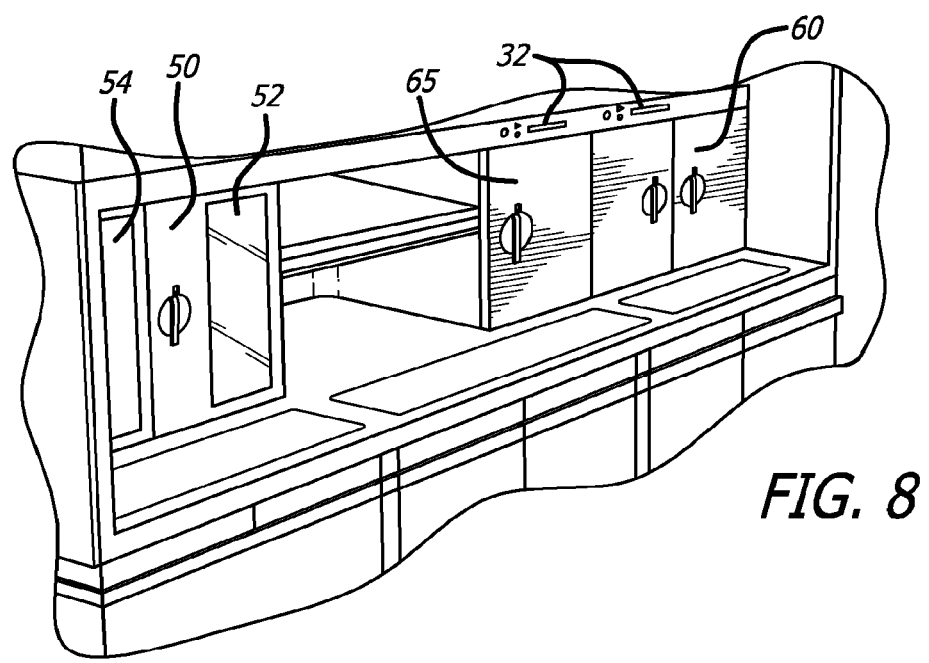
FIG. 8 is an elevated perspective view of the oven and refrigeration units.
Figure 9:
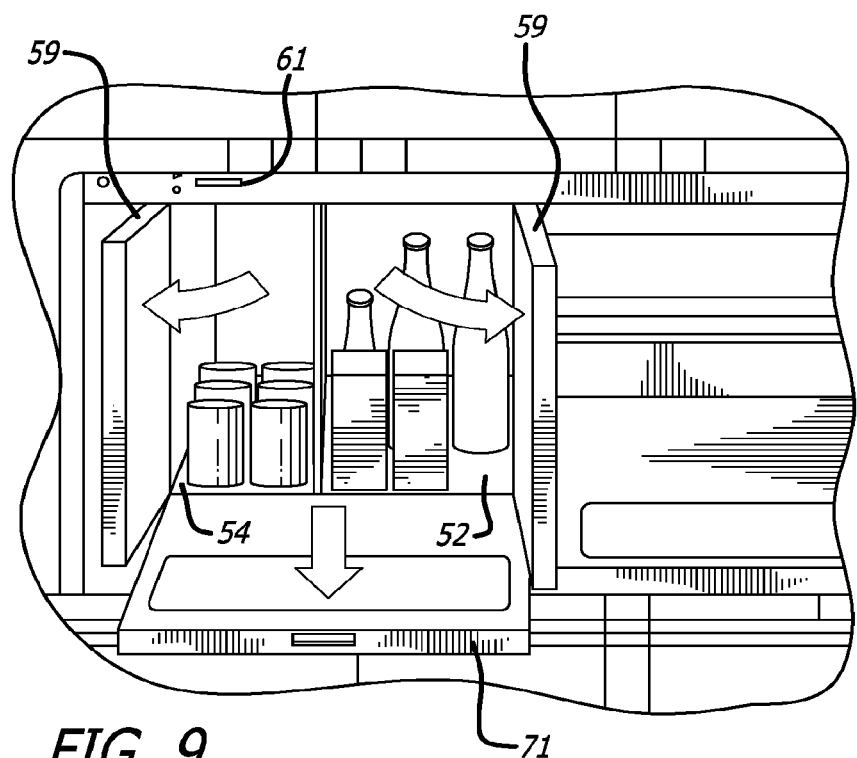
FIG. 9 is an elevated front view of the ovens.
Figure 10:
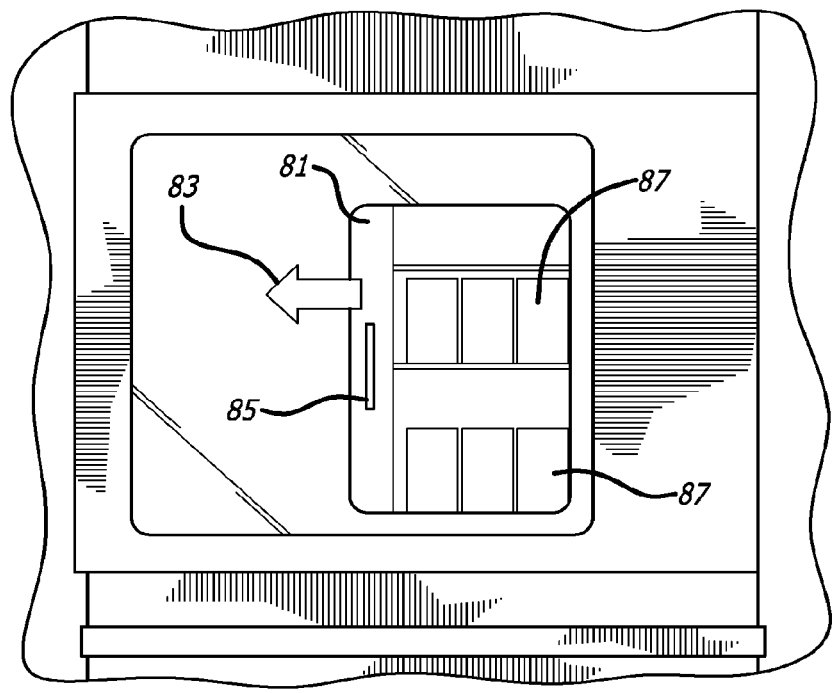
FIG. 10 is an elevated front view of the refrigeration units.

The food preparation station 200 may include a double refrigeration unit 50 and a double oven unit as show in FIG. 8. The double refrigeration unit 50 (see FIG. 9) has one side 52 for chilled beverages and one side 54 for food storage. The double refrigeration section allows for chilling of drinks and food with a side access for self service, while the side fridge section also permits chilled food and drink which can be loaded from the front and self-served from the isle. In front of the refrigeration unit is an extendable work deck 71 that allows drinks to be poured on the deck and then the deck can be reinserted back into its cavity, out of the way of the galley pathway. The touch controls 61 are located immediately above the refrigeration unit for easy accessibility. The augmented capacity of the double refrigeration unit 50 results in both space and weight reduction over multiple single refrigeration units. Each half of the double refrigeration unit 50 includes doors 59 that easily swing outward and touch controls 61 for operation of the respective halves. The food storage side 54 can alternatively be used as a passenger self-service beverage location as shown in FIG. 10 on the side of the food preparation station 200. A door 81 that accesses the refrigerator 50 on the adjacent half 54 can slide open in the direction of arrow 83 using handle 85 to access cans 87 of cooled beverages. In this manner, passengers can walk up to the galley and selected their favorite beverages without the need for assistance from the attendant and without the need to enter the galley itself. It should be noted that the self-service cooler as shown in FIG. 10 can be located on each end of both the beverage station 100 and the food preparation station 200, or only on selected ends. There is also ample space adjacent the sliding door for menu posting or advertising.

Figure 11:
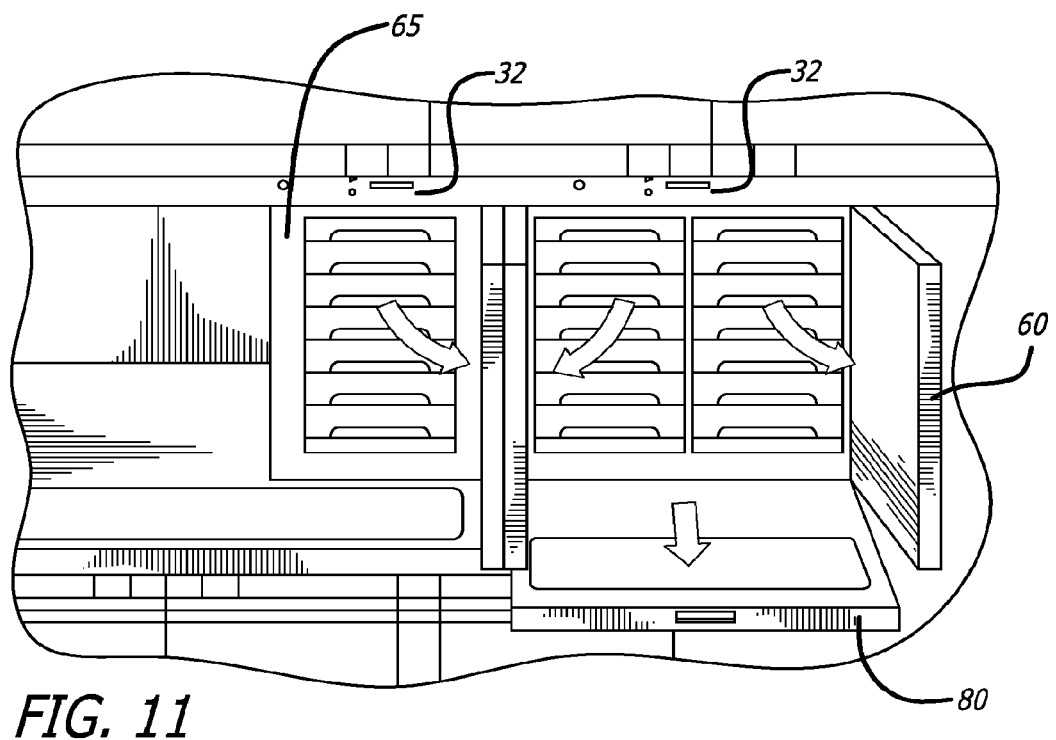
FIG. 11 is an enlarged front view of the side refrigeration panel.

Food preparation station 200 also includes a double oven unit 60 and half oven unit 65, shown in FIG. 11. This configuration saves space and weight over multiple single oven units. Each appliance has the overhead touch controls 32 with touch screens that operate each appliance independently. The user interface screens are both customizable and upgradeable, and haptics may be used to provide tactile feedback to users. As further shown in FIG. 11, the work area adjacent the ovens can also be extended by pull out decks 80 to allow even greater efficiency and usable work area. The pull out decks 80 retract into the station when not in use to preserve space and allow for ease of passage through the galley area. The pull out decks 80 may be supported by grooves or rails that support the decks 80 while permitting extension with limited force. They may also include a detent or stop (not shown) to prevent the pull out decks 80 from accidentally extending during flight.

Figure 12:
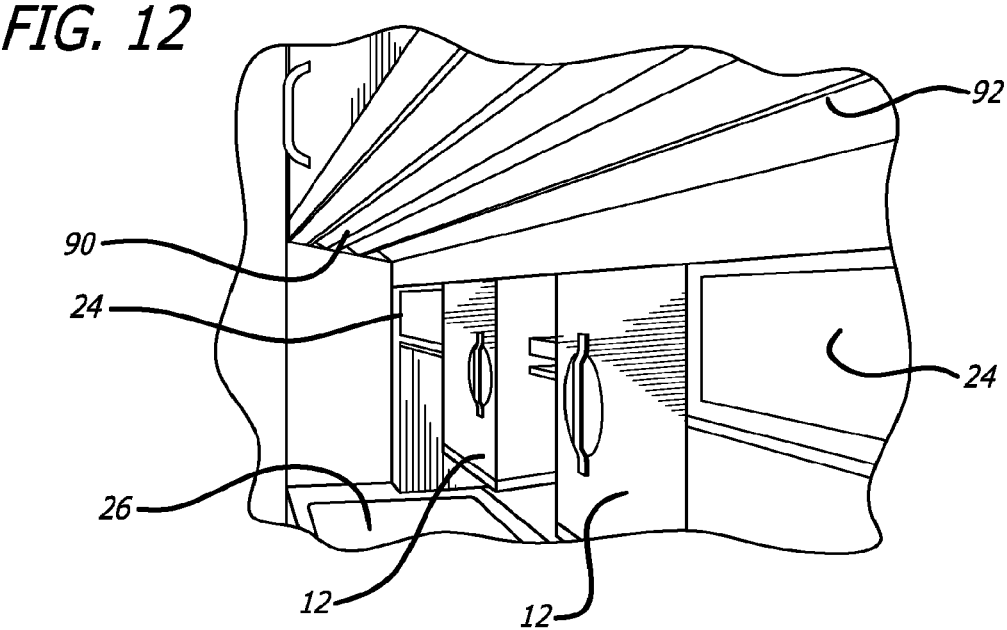
FIG. 12 is a perspective view of the refrigeration, cabinets, and overhead lighting.
Figure 13:
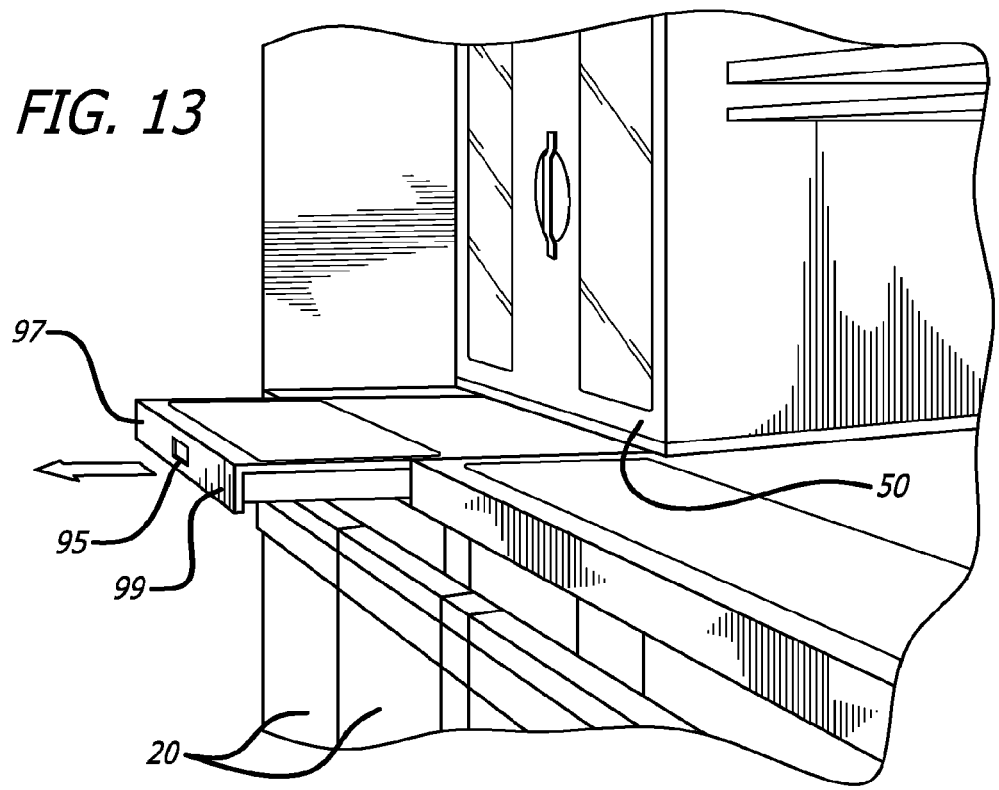
FIG. 13 is a perspective view of the pull-out shelves.

FIG. 12 illustrates a venting and lighting configuration above the cabinets and ovens. Task lighting 90 is integrated into the vent structure 92, and projects down onto the work deck 26 and expandable work deck 99. By incorporating the lighting 90 and venting 92 into the existing structure, there is no projecting or protruding lighting structure that could interfere with the work flow. FIG. 13 further illustrates the extendible work deck 99, which in a preferred embodiment can be pulled out to extend six inches beyond the nominal position. The forward face 97 includes a release latch 95 that allows the work deck to be extended, and once pushed in the latch 95 closes and locks to prevent inadvertent extension of the work deck 99. The extendible work deck 99 can essentially double the usable area of the work space as needed, and then can be easily and quickly returned to the retracted configuration.

Figure 14:
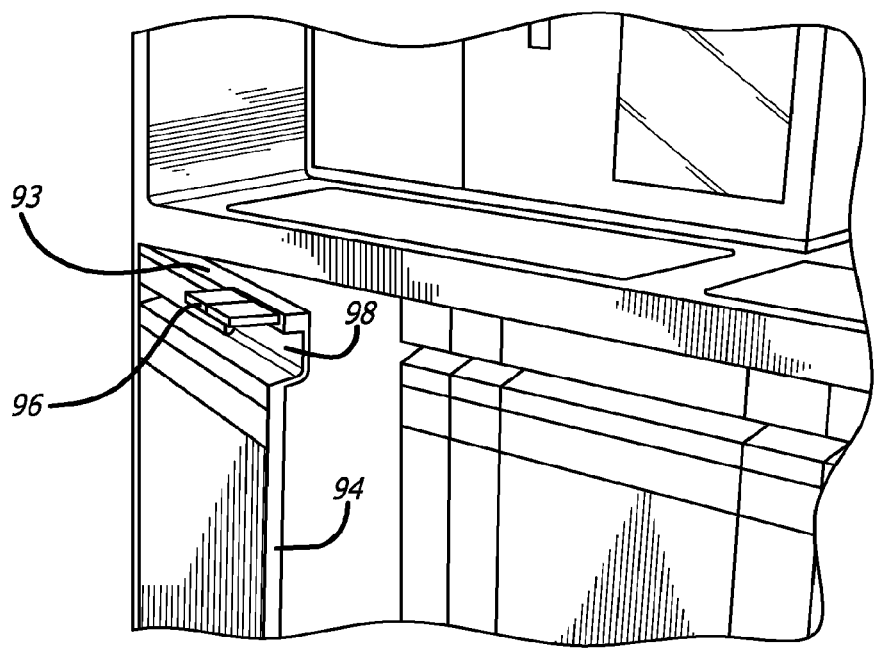
FIG. 14 is a perspective view of the self-locking cabinets.
Figure 15:
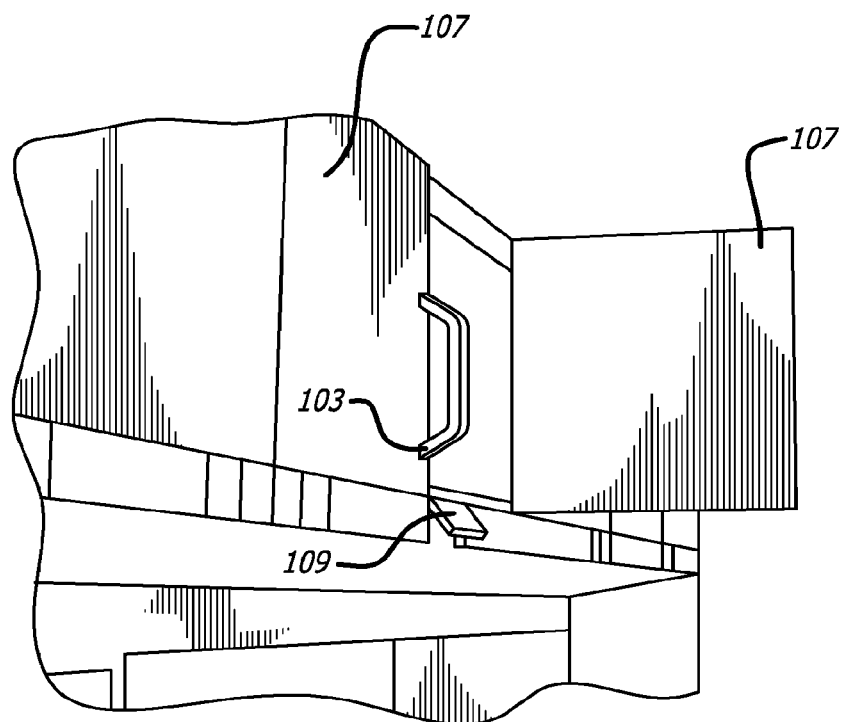
FIG. 15 is a perspective view of the overhead cabinets.

FIG. 14 illustrates a latch mechanism 96 for the release of the housing door 94. In a preferred embodiment, the cabinets and compartments use double retention paddle latches 96 with large "C" channel recesses 98 for easy access. In a preferred embodiment, the latches 96 are positioned in close proximity to allow for single handed operation. The locking mechanism for the housing door 94 is located in the handle 93, and allow the latches 96 to automatically engage when the door 94 is closed. This eliminates the need for manual intervention on behalf of the attendant to secure the door. In the overhead compartments, as shown in FIG. 15, assist handles 103 are integrated into the cupboard door 107 and large double retention paddle latches 109 are position below the standard unit doors for easy accessibility. The standard unit doors 107 are configured to open slightly upon unlatching so as to allow operation with a single hand. The close proximity of these latches 109 allows for single hand operation as well.

The various systems that are conveniently and economically incorporated into the galley of the present invention include, but are not limited to, air or liquid chilling, plumbing, air ducting, and electrical control (smart bar). The method of construction can include molded carbon fiber with a ducting system through the structure. There is also the opportunity for integration of inserts into the structure and door latches (trolley and standard unit doors). Doors include door bump stripe integration, and the galley has storage for portable steps and beverage carts. Oven options include single ovens, double ovens, triple ovens, and half ovens. Waste disposal includes a top loading, counter accessible trash receptacles and top loading trash compacters. Refrigeration units include two door access with a double wide fridge and multiple zone chilling. The beverage areas are preferably formed with a plug and play connection systems. The faucet has a proximity sensor that uses movement in front of the center sensor to turn on and off the faucet for hands-free operation. The electrical control system includes a touch screen user interface and utilizes plug and play replacement. A single set of firmware can be included for all insert operations and a single PCB, with a detached user interface from the insert main body. The user interface can be customizable and upgradeable/updateable with diagnostic capability.

The compact configuration of the galley consumes less space than a conventional aircraft galley, and can free up valuable space for additional passenger seats. These and other features of the invention can be seen in the accompanying drawings and illustrations, which are intended to be exemplary but not limiting as to the scope of the invention.

We claim:

1. An aircraft galley having two stand-alone structures including a beverage station and a food preparation station; each stand-alone structures having opposed front faces, first and second exterior side panels, and a rear wall, the beverage station including a plurality of beverage cart storage compartments and at least one beverage brewing equipment integrated into the beverage station, and the food preparation station including a plurality of beverage cart storage compartments and at least one oven, the galley further comprising:
 a sink and faucet;
 at least one side refrigeration unit having shelves for storing beverages and a sliding door, said at least one side refrigeration unit accessible through the first exterior side panel to allow beverages to be dispensed from a said first exterior side panel of the stand-alone structures;
 at least one touchscreen interface for operation of galley equipment.

2. The aircraft galley of claim 1, wherein the beverage station includes at least one coffee brewing apparatus, one espresso machine, and one hot water providing apparatus.

3. The aircraft galley of claim 2, further comprising a cup storage cupboard above the coffee brewing apparatus wherein said cup storage cupboard has a transparent window.

4. The aircraft galley of claim 1, further comprising a branding placeholder on an exterior side panel of at least one of the stand-alone structures.

5. The aircraft galley of claim 1 wherein the beverage station and the food preparation station include extendable work decks.

6. The aircraft galley of claim 1 wherein the food preparation station includes a refrigeration unit including a first half for chilling food and a second half for chilling beverages.

7. The aircraft galley of claim 6, wherein the refrigeration unit further includes a side refrigeration unit having a door opening on a side of the stand-alone structure for dispensing beverages to passengers.

8. The aircraft galley of claim 1 wherein the food preparation station includes a first oven and a second oven, where a capacity of the second oven is approximately a capacity of the first oven.

9. The aircraft galley of claim 1 wherein the beverage cart storage compartments have latches that lock the compartment and can be opened with one hand.

* * * * *